United States Patent
Klan et al.

(10) Patent No.: US 9,777,588 B2
(45) Date of Patent: Oct. 3, 2017

(54) BRUSH SEAL SYSTEM FOR SEALING A GAP BETWEEN COMPONENTS OF A THERMAL GAS TURBINE THAT MAY BE MOVED RELATIVE TO ONE ANOTHER

(71) Applicant: MTU Aero Engines AG, Munich (DE)

(72) Inventors: Stephan Klan, Berlin (DE); Frank Stiehler, Bad Liebenwerda (DE); Julian Weber, Munich (DE); Markus Schlemmer, Mainburg/Wambach (DE); Stephan Prostler, Inning a. Ammersee (DE)

(73) Assignee: MTU AERO ENGINES AG, Munich (DE)

( * ) Notice: Subject to any disclaimer, the term of this patent is extended or adjusted under 35 U.S.C. 154(b) by 423 days.

(21) Appl. No.: 14/508,212

(22) Filed: Oct. 7, 2014

(65) Prior Publication Data
US 2015/0098798 A1    Apr. 9, 2015

(30) Foreign Application Priority Data
Oct. 7, 2013    (DE) .......................... 10 2013 220 168

(51) Int. Cl.
*F01D 11/12*    (2006.01)
*F16J 15/3288*    (2016.01)
*F01D 11/00*    (2006.01)

(52) U.S. Cl.
CPC ............ *F01D 11/12* (2013.01); *F01D 11/001* (2013.01); *F01D 11/003* (2013.01);
(Continued)

(58) Field of Classification Search
CPC ...... F01D 11/12; F01D 11/001; F01D 11/003; F16J 15/3288; F05D 2240/56
See application file for complete search history.

(56) References Cited

U.S. PATENT DOCUMENTS 5,351,971 A * 10/1994 Short .................. F16J 15/3288
                                                            277/355
5,688,105 A    11/1997 Hoffelner
(Continued)

FOREIGN PATENT DOCUMENTS

DE        19529655 A1    2/1997
DE        69414920 T2    4/1999
(Continued)

OTHER PUBLICATIONS

German Patent and Trademark Office; Office Action of related application DE 10 2013 220 168.0; Jorg Seising; Oct. 25, 2013; 10 pages.

*Primary Examiner* — Gregory Anderson
*Assistant Examiner* — Eldon Brockman
(74) *Attorney, Agent, or Firm* — Munck Wilson Mandala LLP

(57) ABSTRACT

A brush seal system for sealing a gap between components of a thermal gas turbine that may be moved relative to one another includes a gas seal housing that receives at least one brush head of a brush seal and a support element by means of which a brush packet projecting from the brush head of the brush seal may be supported against flexing. The support element and the brush seal housing are embodied as separate components. The invention furthermore relates to a method for producing such a brush seal system and to a thermal gas turbine having such a brush seal system.

18 Claims, 1 Drawing Sheet

(52) U.S. Cl.
CPC ....... *F16J 15/3288* (2013.01); *F05D 2240/56* (2013.01); *Y02T 50/672* (2013.01); *Y10T 29/49297* (2015.01)

(56) References Cited

U.S. PATENT DOCUMENTS

| | | | |
|---|---|---|---|
| 6,173,962 B1* | 1/2001 | Morrison | F16J 15/3288 |
| | | | 277/355 |
| 6,254,344 B1 | 7/2001 | Wright et al. | |
| 6,293,553 B1* | 9/2001 | Werner | F01D 11/001 |
| | | | 277/355 |
| 6,302,400 B1* | 10/2001 | Werner | F16J 15/3288 |
| | | | 277/355 |
| 6,695,314 B1* | 2/2004 | Gail | F01D 11/001 |
| | | | 277/355 |
| 2001/0004145 A1* | 6/2001 | Wright | F16J 15/3288 |
| | | | 277/355 |
| 2002/0020968 A1 | 2/2002 | Gail et al. | |
| 2003/0178778 A1 | 9/2003 | Szymbor et al. | |
| 2004/0018085 A1* | 1/2004 | Dhar | F01D 11/00 |
| | | | 415/174.2 |
| 2005/0040602 A1* | 2/2005 | Beichl | F16J 15/3288 |
| | | | 277/355 |
| 2008/0258403 A1* | 10/2008 | Beichl | F01D 11/001 |
| | | | 277/355 |
| 2010/0068042 A1* | 3/2010 | Bruck | F16J 15/3288 |
| | | | 415/174.2 |

FOREIGN PATENT DOCUMENTS

| | | |
|---|---|---|
| DE | 69907859 T2 | 10/2003 |
| DE | 60004772 T2 | 7/2004 |
| DE | 60312066 T2 | 11/2007 |
| EP | 1331423 A2 | 7/2003 |

\* cited by examiner

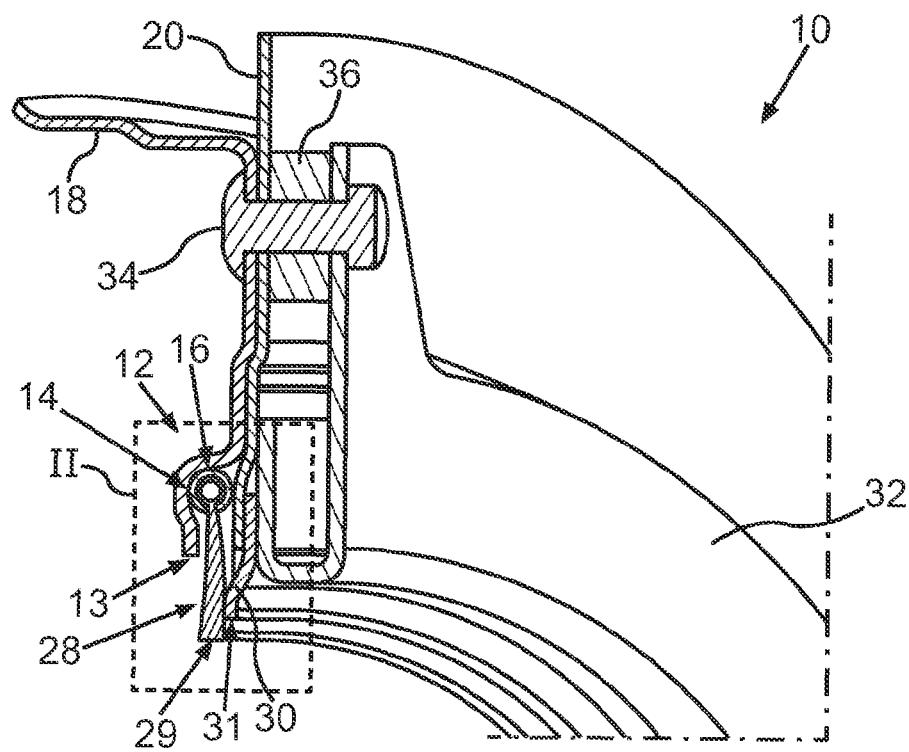
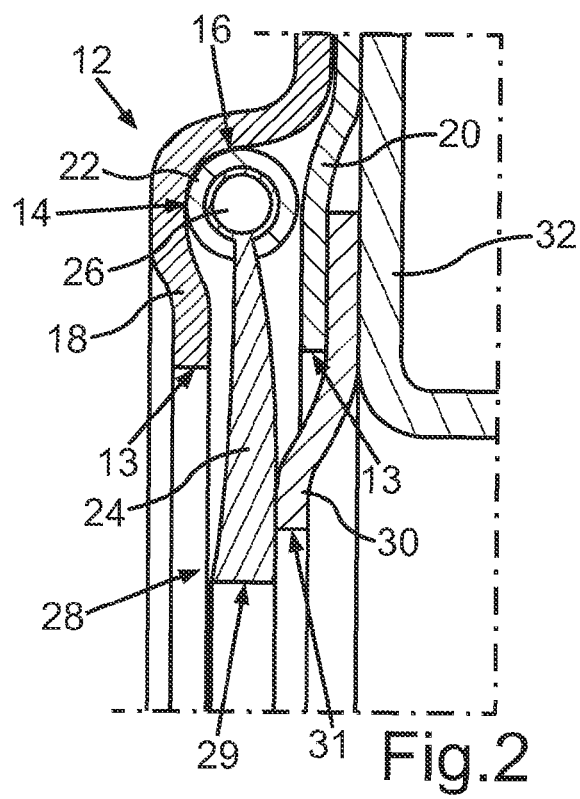

BRUSH SEAL SYSTEM FOR SEALING A GAP BETWEEN COMPONENTS OF A THERMAL GAS TURBINE THAT MAY BE MOVED RELATIVE TO ONE ANOTHER

CROSS-REFERENCE TO RELATED APPLICATIONS

This application claims priority to and/or benefit of German Application No. DE 10 2013 220 168.0, filed Oct. 7, 2013, entitled Bürstendichtungssystem zum Abdichten eines Spalts zwischen relativ zueinander bewegbaren Bauteilen einer thermischen Gasturbine, the specification of which is incorporated by reference herein in its entirety.

TECHNICAL FIELD

The invention relates to a brush seal system for sealing a gap between components of a thermal gas turbine that may be moved relative to one another. The invention furthermore relates to a method for producing such a brush seal system and to a thermal gas turbine having such a brush seal system.

BACKGROUND

Various brush seal systems for thermal gas turbines are known from the prior art. There are numerous applications in which two parts that may be moved relative to one another are to be non-hermetically sealed against one another. One such application for instance is sealing an annular gap between a stator and a rotor of a gas turbine for an aircraft, through which gap gas flows. Brush seal systems are frequently used for non-hermetically sealing annular intermediate spaces between assemblies that rotate relative to one another because brush seal systems are lighter and more compact than labyrinth seals and have the same sealing effect. For example, US 2002/0020968 A1 discloses different brush seal systems for aircraft engines. The brush seal systems each include a multi-part brush seal housing that receives an area of the actual brush seal and secures it in position. To this end, each brush seal housing comprises at least one support plate and one cover plate that are connected to one another and that together wrap around at least one brush head of the brush seal system in a U shape and secure it against falling out of the brush seal housing. The cover plate or the area of the two-part brush seal housing disposed upstream in the flow direction is intended primarily to hold off interfering flow influences on a brush packet that projects from the brush head and out of the brush seal housing, while the support plate of the brush seal housing, which support plate is disposed downstream in the flow direction, is a support element that is intended to prevent the brush packet from flexing in the axial direction of the aircraft engine due to the pressure difference over the brush seal housing. One-piece bush seal housings are also known that are likewise embodied in at least an approximate U-shape.

However, it is a drawback of the known brush seal systems that repair of the brush seal housing, for instance after rubbing against the rotor of the gas turbine, is relatively complicated and expensive. In addition, the brush seal housing can damage the rotor if the former touches against the latter. Since, due to its function as a brush seal carrier and support element of the brush packet, the configuration of the brush seal housing can only be varied to a very limited degree, however, in the past an embodiment of known brush seal systems that is more tolerant to such touching and is more repair-friendly has not been possible.

A need therefore exists, for an improved brush seal system of the aforesaid type that permits a more geometrically variable and repair-friendly embodiment. A need further exists, for a method for producing such a brush seal system and for a thermal gas turbine having such a brush seal system.

SUMMARY AND DESCRIPTION

These objects are inventively attained using a brush seal system having the features described and claimed herein, using a method as described and claimed herein for producing such a brush seal system, and using a thermal gas turbine as described and claimed herein. Advantageous embodiments with useful refinements of the invention further described and claimed herein.

A first aspect of the invention relates to a brush seal system for sealing a gap between components of a thermal gas turbine that may be moved relative to one another. It is inventively provided that the support element and the brush seal housing are embodied as separate components. In other words, in contrast to the prior art, it is provided that the support element is not an integral component of the one-part or multi-part brush seal housing, but instead is embodied as a separate component. Embodiment of the support element as a component that is separate from the brush seal housing attains an advantageous increase in design freedom for the brush seal system, since there is a corresponding separation of the functions of "brush seal carrier," which continues to be satisfied by the brush seal housing, and "support of the brush packet," which is now assumed by the separate support element. Due to this separation of the functional areas of the brush seal system, not only is there increased geometric design freedom, but also production is simplified and there is greater ease of repair, because if there is damage, that is for instance if a rotor is touched, only the separate support element has to be reconditioned or exchanged, but not the brush seal housing that carries the brush seal. In turn the brush seal housing may be designed significantly more freely with respect to its mechanical structural behavior. Another advantage is that the inventive brush seal system may be adapted particularly easily for different purposes and engine types, since the same brush seal housing must merely be combined with different brush seals and support elements to adapt the brush seal system, to different size radial gaps, for instance.

In one advantageous embodiment of the invention it is provided that an end area of the support element is arranged closer to an end of the brush packet opposing the brush head than an end area of the brush seal housing. This ensures that if there is any touching only the support element disposed closer to the ends of the brush packet is damaged, but not the brush seal housing farther away from the ends of the brush packet. This permits essentially touch-tolerant designs of the brush seal system, because if there is damage it is not necessary to disassemble the brush seal housing and the brush seal.

Additional advantages result from the fact that the support element is fixed in a positive and/or material fit to the brush seal housing. This permits a particularly flexible embodiment of the brush seal system.

It may also be alternatively or additionally provided that the support element is arranged inside and/or outside of the brush seal housing. This also permits the design of a particularly flexible embodiment of the brush seal system.

In another embodiment of the invention, the design freedom is further enhanced in that the support element is embodied as a ring and/or as a ring segment. A ring segment embodiment of the support element in particular simplifies any repairs because as a rule only a damaged ring segment must be repaired or exchanged, but not the entire ring. In principle the brush seal housing and the entire brush seal system may be embodied in segments, as well.

In another advantageous embodiment of the invention it is provided that the support element comprises a different material than the brush seal housing and/or has a different wall thickness than the brush seal housing. Due to the free material selection and the different wall thicknesses, the brush seal system is especially variable and may be adapted to different applications in an optimum manner.

Because the brush seal housing is embodied in multiple parts, especially in two parts, the design freedom for the inventive brush seal system is further increased.

In another embodiment of the invention, the mechanical properties of the brush seal system may be improved in that the brush seal system has a stiffening element that is affixed to the brush seal housing.

In another advantageous embodiment of the invention it is provided that the stiffening element is embodied as curved metal sheet and/or that the stiffening element is riveted to the brush seal housing and/or that arranged between the stiffening element and the brush seal housing is at least one slide element, in particular a sliding block. Because the stiffening element is embodied as curved metal sheet, it is possible to attain resilient flexible stiffening of the brush seal housing in a cost-effective manner that is simple in terms of design. Because the stiffening element is riveted to the brush seal housing, a positive fit and/or non-positive fit connection may be attained between the stiffening element and the brush seal housing in a cost-effective manner that is simple in terms of design. Arranging a sliding block between the stiffening element and the brush seal housing ensures, in a manner that is simple in terms of design, a bearing point having a translational degree of freedom for centering of the brush seal system. The bearing point is thus formed by the slide element, in particular a sliding block, the sliding block engaging in a corresponding groove when the brush seal system is assembled. Due to the centering, it is possible to better compensate relative changes in dimensions between the coaxially arranged components that are to be sealed against one another that is between a stator and a rotor, which changes are caused by thermal influences. The slide element or elements, especially the sliding blocks, may be embodied as separate assemblies and may be joined to the stiffening element, for instance using rivets.

There are additional advantages when the support element is arranged between the brush seal housing and the stiffening element. In this way the support element may be secured in position by a type of clamping. In addition, the support element and the stiffening element may advantageously be affixed to the brush seal housing using the same fastening means. This permits particularly rapid, simple, and cost-effective assembly and disassembly of the support element.

A second aspect of the invention relates to a method for producing a brush seal system for sealing a gap between components of a thermal gas turbine that may be moved relative to one another. The inventive method includes at least the method steps of preparing a brush seal housing, arranging a brush seal so that at least one brush head of the brush seal is received and secured in position in the brush seal housing, providing a separate support element, and arranging the support element on the brush seal housing so that a brush packet projecting from the brush head of the brush seal may be supported against flexing by the support element. In other words, in contrast to the prior art, it is provided that on the one hand a brush seal housing is provided and on the other hand a separate support element is provided, the brush seal housing being used as a seal carrier for the brush seal and the support element being affixed to the brush seal housing as protection for the brush packet against undesired flexing. In this manner an advantageous increase in the design freedom for the brush seal system is attained, since the "brush seal carrier" function, which is satisfied by the brush seal housing, and "support for the brush packet" function, which is assumed by separate support elements, are separated. This separation of the functional areas of the inventively produced brush seal system results in increased geometric design freedom, simplified production, and increased ease of repair, since if there is damage, that is for instance after a rotor is touched, only the separate support element has to be reconditioned or exchanged, but not the brush housing carrying the brush seal. Therefore, the brush seal housing may be designed significantly more freely with respect to its mechanical structural behavior. In principle, the brush seal system may be disassembled in reverse sequence. Another advantage is found in that the inventive brush seal system may be adapted in a particularly simple manner for different employment purposes and types of engines since the brush seal housing merely has to be combined with different brush seals and/or support elements to adapt the brush seal system for instance to different size radial gaps. Additional resultant features and their advantages may be found in the descriptions of the first aspect of the invention, wherein advantageous embodiments of the first aspect of the invention are to be considered advantageous embodiments of the second aspect of the invention and vice versa.

A third aspect of the invention relates to a thermal gas turbine, in particular an aircraft engine, having at least one brush seal system that is embodied in accordance with the first aspect of the invention and/or may be obtained using a method in accordance with the second aspect of the invention. The features resulting from this, and their advantages, may be found in the descriptions of the first and second aspects of the invention, wherein advantageous embodiments of the first and second aspects of the invention are to be considered advantageous embodiments of the third aspect of the invention and vice versa.

In one advantageous embodiment of the invention it is provided that the brush seal housing of the brush seal system for sealing a gap between a rotor and a stator of the gas turbine is affixed to the stator. In other words, it is provided that the brush seal housing is affixed, directly or indirectly, to a stator of the gas turbine so that the ends of the brush packet opposing the brush head rest on an associated surface of the rotor. This represents a reliable arrangement of the brush seal system and is particularly stable mechanically.

In another embodiment it has been found to be advantageous when the stator is embodied as a guide vane and/or as a guide vane cluster and/or as a guide vane ring. If the stator is segmented, it has proved advantageous when the brush seal system is also embodied segmented, since this permits particularly simple assembly and disassembly.

Additional features of the invention result from the claims, the exemplary embodiment, and the drawings. The features and combinations of features cited in the description and the features and combinations of features cited in the following in the exemplary embodiment may be used not only in the combination provided, but also in other combinations without departing from the idea of the invention.

BRIEF DESCRIPTION OF THE DRAWINGS

FIG. 1 is a schematic perspective elevation of a section through an inventive brush seal system; and, FIG. 2 is an enlarged schematic view of the detail II illustrated in FIG. 1.

DETAILED DESCRIPTION

FIG. 1 provides a schematic perspective elevation of a section through an inventive brush seal system 10 and shall be explained in the following in combination with FIG. 2, which provides an enlarged schematic view of the detail II illustrated in FIG. 1. The brush seal system 10, which in this case is embodied in a ring segment and may be attached to a guide vane cluster of an aircraft engine in a manner known per se, has a brush seal housing 12 that receives and wraps around a brush head 14 of a brush seal 16 essentially in a U shape. The brush seal housing 12 is thus in this case embodied in two parts and includes a front cover plate 18 as seen in the flow direction and a rear cover plate 20, as seen in the flow direction, that together when assembled form a receiving space for receiving the brush head 14. In principle, however, it may also be provided that the brush seal housing 12 is embodied in one piece or comprises more than two individual components. As may be seen especially in FIG. 2, the cover plate 18 is curved inward radially below the brush head 14 so that the brush head 14 and thus the brush seal 16 is undetachably retained and secured in position in the brush seal housing 12. Alternatively or in addition, the brush seal 16 may also be clamped between the cover plate 18 and the cover plate 20 to attain secure positioning in the brush seal housing 12. In principle, instead of the cover plate 18 or in addition to the cover plate 18, the cover plate 20 may also be curved such that the brush head 14 received in the brush seal housing 12 is secured in position or is affixed in the brush seal housing 12.

The brush head 14 itself comprises a clamping tube 22 by means of which fiber or wire bundles 24 are fixed on a core wire 26. The fiber or wire bundles 24 project out of the brush seal housing 12 and form a brush packet 28, the end area 29 of which may be moved up against an associated seal surface of a rotor (not shown) to seal an annular gap between stator and rotor.

In order to secure the brush packet 28 against flexing axially due to the pressure differences that occur during the operation of the associated aircraft engine, the brush seal system 10 includes a separately embodied support element 30 with which an end area 29 of the brush packet 28 that opposes the brush head 14 may be supported. The support element 30, which to this end has an end area 31 curved upstream in the flow direction, against which the brush packet 28 is positioned, is arranged outside of the brush seal housing 12 and is clamped, and thereby secured in position, between the cover plate 20 of the brush seal housing 12 and a stiffening element 32. It is easier to exchange the support element 30 due to this positive-fit connection. Alternatively or in addition, the support element 30, which like the brush seal system 10 in this case is also embodied in ring segments, may also be joined to the brush seal housing 12 and/or to the stiffening element 32 in a material fit. The stiffening element 32 is embodied as a somewhat J-shaped curved metal sheet and is joined by rivets 34 to the brush seal housing 12, that is, to the cover plate 18 and the cover plate 20. A slide element 36 embodied as a sliding block is additionally arranged between the stiffening element 32 and the brush seal housing 12 and is also affixed to the brush seal system 10 by means of the rivet 34. The slide element 36 represents a bearing point with a translational degree of freedom for centering of the brush seal system 10. To this end the slide element 36 engages in a corresponding groove on the guide vane ring when assembled. Due to the centering of the brush seal system 10, relative dimensional changes between stator and rotor that are caused by thermal influences may be better compensated. In principle, however, the inventive brush seal system 10 is not limited to this type of assembly.

As may be seen in particular in FIG. 2, the end area 31 of the support element 30 is arranged closer to an end area 29 of the brush packet 28 that opposes the brush head 14 than the corresponding end area 13 of the brush seal housing 12, that is, than the ends 13 of the cover plate 18 and the cover plate 20. This ensures that if the rotor is touched, only the support element, 30 but not the brush seal housing 12 itself, is affected. Due to the separate embodiment of the support element 30, repair or exchange of the support element 30 after damage is rendered significantly easier.

Since the brush seal housing 12 and the support element 30 are embodied as separate components, the "housing or securing the position of the brush seal 16" functionality is advantageously separated from the "supporting the brush packet 28" functionality. Because of this functional separation, the materials for the brush seal housing 12, that is, for the cover plate 18 and the cover plate 20, and for the separate support element 30, may be selected independently of one another. For instance, the support element 30 may comprise a softer material than the brush seal housing 12 to ensure the brush seal system 10 tolerates touching. In principle the support element 30 also does not have to be embodied from metal sheet or metal parts, but instead may comprise for instance a ceramic material or a ceramic fiber composite material or the like. Additional advantages of separation may be found in the increase in design and geometric design freedom, so that for instance different wall thicknesses, a different mechanical structure behavior during operation, different seal effects, and the like may be realized simply and cost-effectively.

What is claimed is:

1. A brush seal system for sealing a gap between relatively movable components of a thermal gas turbine, the sealing system comprising:
    a brush seal having a brush head and a brush packet, the brush packet projecting from the brush head in a first direction toward a brush packet end area disposed at an end of the brush seal opposing the brush head;
    a brush seal housing connected to a first component of the thermal gas turbine, the brush seal housing receiving the brush head of the brush seal so the brush head is not movable relative to the brush seal housing and so the brush packet projects in the first direction toward a second component of the thermal gas turbine that is movable relative to the first component across a gap between the relatively movable first and second components; and
    a support element connected to the first component so the support element is not movable relative to the brush seal housing, the support element projecting in the first direction and ending at a support element end area, the support element contacting the brush packet projecting from the brush head to support the brush packet against flexing, but the support element not contacting the brush head;
wherein the support element and the brush seal housing are embodied as separate components.

2. A brush seal system in accordance with claim 1, wherein the brush seal housing extends in the first direction to a brush seal housing end area and wherein the support element end area is arranged closer, in the first direction, to the brush packet end area than the brush seal housing end area of the brush seal housing is arranged to the brush packet end area.

3. A brush seal system in accordance with claim 1, wherein the support element is fixed in a positive and/or material fit to the brush seal housing.

4. A brush seal system in accordance with claim 1, wherein the support element is configured as a ring or as a ring segment.

5. A brush seal system in accordance with claim 1, wherein the support element is formed from a first material and the brush seal housing is formed from a second material that is different from the first material.

6. A brush seal system in accordance with claim 1, wherein the support element has a first wall thickness and the brush seal housing has a second wall thickness that is different from the first wall thickness.

7. A brush seal system in accordance with claim 1, wherein the brush seal housing comprises multiple parts including at least a front cover plate and a separately formed rear cover plate.

8. A brush seal system in accordance with claim 1, further comprising a stiffening element that is connected to the brush seal housing.

9. A brush seal system in accordance with claim 8, wherein arranged between the stiffening element and the brush seal housing is at least one slide element with a translational degree of freedom.

10. A brush seal system in accordance with claim 8, wherein the support element is arranged between the brush seal housing and the stiffening element so that the support element is captured between the brush seal housing and the stiffening element so that the support element is not movable relative to the brush seal housing.

11. A thermal gas turbine, in particular an aircraft engine, including at least one brush seal system in accordance with claim 1.

12. A thermal gas turbine in accordance with claim 11, wherein the first component to which the brush seal housing of the brush seal system is affixed is a stator of the gas turbine and the second component that is relatively movable is a rotor of the gas turbine.

13. A thermal gas turbine in accordance with claim 12, wherein the stator is embodied as a guide vane or as a guide vane cluster or as a guide vane ring.

14. A method for producing a brush seal system for sealing a gap between relatively movable components of a thermal gas turbine, the method including the following steps:
providing a brush seal having a brush head and a brush packet, the brush packet projecting from the brush head in a first direction toward a brush packet end area disposed at an end of the brush seal opposing the brush head;
providing a brush seal housing mounted to a first component of a thermal gas turbine;
arranging the brush seal in the brush seal housing so the brush head of the brush seal is received in the brush seal housing so the brush head is not movable relative to the brush seal housing and so the brush packet projects in the first direction toward a second component of the thermal gas turbine that is movable relative to the first component across a gap between the relatively movable first and second components;
providing a separate support element that is not part of the brush seal housing; and,
mounting the support element on the first component so that the support element does not contact the brush head and so that the brush packet projecting from the brush head of the brush seal is supported against flexing by the support element.

15. A brush seal system for sealing a radial annular gap between a stator and a relatively movable rotor of a thermal gas turbine, wherein pressure differences that occur during operation of the gas turbine define an axial flow direction from upstream to downstream, the sealing system comprising:
a brush seal having a brush head and a brush packet, the brush packet extending from the brush head to a brush packet end area disposed at an opposite end of the brush seal;
a brush seal housing connectable to the stator of a thermal gas turbine, the brush seal housing, when connected to the stator, securing the brush head of the brush seal between opposing portions of the brush seal housing so the brush head is fixed relative to the brush seal housing, so the brush packet extends radially inward across an annular gap from the stator to a relatively movable rotor, and so the brush packet end area is against a seal surface of the relatively movable rotor; and
a support element separable from the brush seal housing and connectable to the stator, the support element, when connected to the stator, being fixed relative to the brush seal housing and disposed downstream, in a flow direction defined by pressure differences during operation of the gas turbine, from the brush seal housing;
the support element extending radially inward below the brush seal housing and having a support element end area disposed radially below the brush seal housing;
the support element end area curving upstream in the flow direction and contacting the brush packet extending from the brush head in an area radially below the brush seal housing and radially above the brush packet end area to support the brush packet against flexing in the axial direction due to pressure differences that occur during operation of the gas turbine.

16. A brush seal system in accordance with claim 15, wherein the brush seal housing further comprises:
an upstream cover plate; and
a downstream cover plate, the respective cover plates forming, when assembled together, a receiving space for receiving the brush head of the brush seal therebetween;
wherein at least one of the upstream cover plate and the downstream cover plate is curved toward the other at a location radially below the brush head so the brush head is undetachably retained in the brush seal housing, and
wherein neither the upstream cover plate nor the downstream cover plate contacts the brush packet extending from the brush head.

17. A brush seal system in accordance with claim 16, further comprising:
- a stiffening element connectable to the stator and, when connected to the stator, disposed downstream in the flow direction from the brush seal housing; and
- wherein a portion of the support element is disposed between the brush seal housing and the stiffening element so that the support element is captured between the brush seal housing and the stiffening element so that the support element is not movable relative to the brush seal housing.

18. A brush seal system in accordance with claim 17, further comprising:
- a slide element slidably mounted to the stator of the gas turbine with a translational degree of freedom in the radial direction; and
- wherein at least one of the brush seal housing, support element or stiffening element are connectable to the stator by connection to the slide element;
    - whereby any of the brush seal housing, support element or stiffening element connected to the stator by connection to the slide element are provided with a translational degree of freedom for centering the brush seal system around the rotor of the gas turbine.

* * * * *